US012252383B2

(12) United States Patent
Scaglione et al.

(10) Patent No.: US 12,252,383 B2
(45) Date of Patent: Mar. 18, 2025

(54) HANDLING DEVICE FOR CONTAINERS IN CAPPING INSTALLATIONS

(71) Applicant: AROL S.P.A., Canelli (IT)

(72) Inventors: Massimiliano Scaglione, Canelli (IT); Francesco Palotto, Canelli (IT)

(73) Assignee: AROL S.P.A., Canelli (IT)

( * ) Notice: Subject to any disclaimer, the term of this patent is extended or adjusted under 35 U.S.C. 154(b) by 136 days.

(21) Appl. No.: 18/011,181

(22) PCT Filed: Jun. 22, 2021

(86) PCT No.: PCT/IB2021/055501
§ 371 (c)(1),
(2) Date: Dec. 18, 2022

(87) PCT Pub. No.: WO2021/260548
PCT Pub. Date: Dec. 30, 2021

(65) Prior Publication Data
US 2023/0211992 A1  Jul. 6, 2023

(30) Foreign Application Priority Data
Jun. 22, 2020 (IT) .................. 102020000014836

(51) Int. Cl.
*B67B 3/20* (2006.01)
*B65G 47/86* (2006.01)
*B67C 3/24* (2006.01)

(52) U.S. Cl.
CPC .............. *B67B 3/20* (2013.01); *B65G 47/847* (2013.01); *B67C 3/242* (2013.01)

(58) Field of Classification Search
CPC .......... B67B 3/20; B65G 47/847; B67C 3/242
See application file for complete search history.

(56) References Cited

U.S. PATENT DOCUMENTS 2,987,313 A * 6/1961 Bjering ................... B67B 3/206
269/254 R
5,301,725 A * 4/1994 Meinzinger ............. B67C 3/242
141/378
(Continued)

FOREIGN PATENT DOCUMENTS

DE  1607970 A1  10/1970
EP  1712496 A1  10/2006
(Continued)

OTHER PUBLICATIONS

International Search Report and Written Opinion of the International Searching Authority issued for International PCT Application No. PCT/IB2021/055501 on Nov. 5, 2021.

*Primary Examiner* — Gloria R Weeks
*Assistant Examiner* — Mobeen Ahmed
(74) *Attorney, Agent, or Firm* — Howson & Howson LLP

(57) ABSTRACT

A handling device for handling containers in a capping and/or inspection station of a capping installation is provided. The device includes a centering member, having a side opening arranged to receive a neck region of a container, and a clamp gripping assembly for holding the container during the capping operations. The clamp gripping assembly is mounted so as to be vertically slidable between a first position, in which it is disengaged from the container and enables removing a capped container and receiving a container to be capped, and a second position, which is taken by the gripping assembly during capping and/or inspection and in which it engages the container. The clamp gripping assembly applies an axial load to the container when in the second position.

20 Claims, 8 Drawing Sheets

(56) References Cited

U.S. PATENT DOCUMENTS

| | | | | |
|---|---|---|---|---|
| 5,711,411 A * | 1/1998 | Zurweller | B67C 3/242 | 198/470.1 |
| 5,778,633 A * | 7/1998 | Sweeny | B65B 59/003 | 53/201 |
| 6,073,667 A * | 6/2000 | Graffin | G01G 3/1402 | 177/229 |
| 6,302,172 B1 * | 10/2001 | De Villele | C10M 143/00 | 198/470.1 |
| 6,898,920 B2 * | 5/2005 | Hoss | B67B 3/2006 | 53/317 |
| 7,028,857 B2 * | 4/2006 | Peronek | B65G 51/035 | 215/42 |
| 7,533,590 B2 * | 5/2009 | Cirio | B67B 3/18 | 53/325 |
| 8,291,948 B1 * | 10/2012 | Marks | B67C 3/242 | 141/369 |
| 8,439,413 B2 * | 5/2013 | Cirio | B67B 3/206 | 53/367 |
| 8,622,469 B2 * | 1/2014 | Hogg | B60R 11/00 | 248/316.5 |
| 9,120,665 B1 * | 9/2015 | Fogg | B65B 59/003 | |
| 9,233,820 B2 * | 1/2016 | Bernhard | B67B 3/2033 | |
| 9,388,036 B2 * | 7/2016 | Fogg | F16M 13/00 | |
| 10,246,269 B2 * | 4/2019 | Rillema | B65G 47/847 | |
| 10,994,976 B2 | 5/2021 | Caffa et al. | | |
| 11,121,612 B2 | 9/2021 | Cipriani | | |
| 11,121,616 B2 | 9/2021 | Cipriani | | |
| 11,162,853 B2 | 11/2021 | Caffa et al. | | |
| 11,192,767 B2 | 12/2021 | Caffa et al. | | |
| 11,242,235 B2 | 2/2022 | Caffa et al. | | |
| 11,374,481 B2 | 6/2022 | Amerio et al. | | |
| 11,492,242 B2 | 11/2022 | Caffa et al. | | |
| 2003/0173258 A1 * | 9/2003 | Hoss | B67C 3/242 | 209/1 |
| 2004/0187441 A1 * | 9/2004 | Cirio | B67B 3/24 | 53/287 |
| 2005/0268988 A1 * | 12/2005 | Cavallari | B67C 3/202 | 141/177 |
| 2008/0038099 A1 * | 2/2008 | Burgmeier | B67C 3/242 | 414/222.01 |
| 2008/0223477 A1 * | 9/2008 | Stocchi | B67C 3/242 | 141/1 |
| 2010/0077703 A1 * | 4/2010 | Gourlaouen | B65G 47/847 | 53/473 |
| 2010/0289287 A1 * | 11/2010 | Preti | B65G 47/847 | 294/116 |
| 2011/0042537 A1 * | 2/2011 | Fahldiek | B67C 3/242 | 248/313 |
| 2011/0064555 A1 * | 3/2011 | Stoiber | B65G 47/847 | 414/751.1 |
| 2011/0089003 A1 * | 4/2011 | Fahldieck | B65G 47/847 | 198/803.1 |
| 2011/0131924 A1 * | 6/2011 | Martin | B67C 3/242 | 53/317 |
| 2011/0197995 A1 * | 8/2011 | Bodtlander | B67C 7/0053 | 141/269 |
| 2011/0203906 A1 * | 8/2011 | Fahldieck | B67C 3/242 | 198/803.3 |
| 2011/0220463 A1 * | 9/2011 | Fahldeck | B65G 47/847 | 294/198 |
| 2011/0266818 A1 * | 11/2011 | Cirio | B67B 3/206 | 294/110.2 |
| 2011/0308666 A1 * | 12/2011 | Bodtlander | B65G 47/847 | 141/165 |
| 2012/0085068 A1 | 4/2012 | Cirio | | |
| 2012/0318405 A1 * | 12/2012 | Spasov | B67C 3/202 | 141/83 |
| 2013/0193702 A1 * | 8/2013 | Fahldieck | B65G 47/847 | 294/199 |
| 2015/0314966 A1 * | 11/2015 | Fahldieck | B67C 3/242 | 294/199 |
| 2016/0122176 A1 * | 5/2016 | Fogg | B67C 3/242 | 248/602 |
| 2019/0276175 A1 * | 9/2019 | Nava | B65G 47/847 | |
| 2020/0010285 A1 * | 1/2020 | Ullrich | B65G 47/847 | |
| 2020/0087129 A1 | 3/2020 | Caffa et al. | | |
| 2020/0156913 A1 | 5/2020 | Forno | | |
| 2021/0094765 A1 * | 4/2021 | Bektasevic | B67C 3/242 | |
| 2021/0129350 A1 * | 5/2021 | Elmar | B65G 47/90 | |
| 2021/0130110 A1 * | 5/2021 | Elmar | B65G 47/90 | |
| 2021/0148405 A1 | 5/2021 | Amerio et al. | | |
| 2021/0206584 A1 * | 7/2021 | Fahldieck | B65G 47/847 | |
| 2021/0362961 A1 * | 11/2021 | Leidel | B65G 47/847 | |
| 2021/0372497 A1 * | 12/2021 | Groholski | B65G 47/842 | |
| 2021/0379733 A1 * | 12/2021 | Ehrismann | B67B 3/00 | |
| 2022/0306401 A1 * | 9/2022 | Leidel | B65G 47/847 | |

FOREIGN PATENT DOCUMENTS

| | | | | |
|---|---|---|---|---|
| FR | 3029511 A1 * | 6/2016 | | B65C 9/06 |
| WO | WO-03078285 A1 * | 9/2003 | | B65G 47/847 |

* cited by examiner

[Fig. 1]
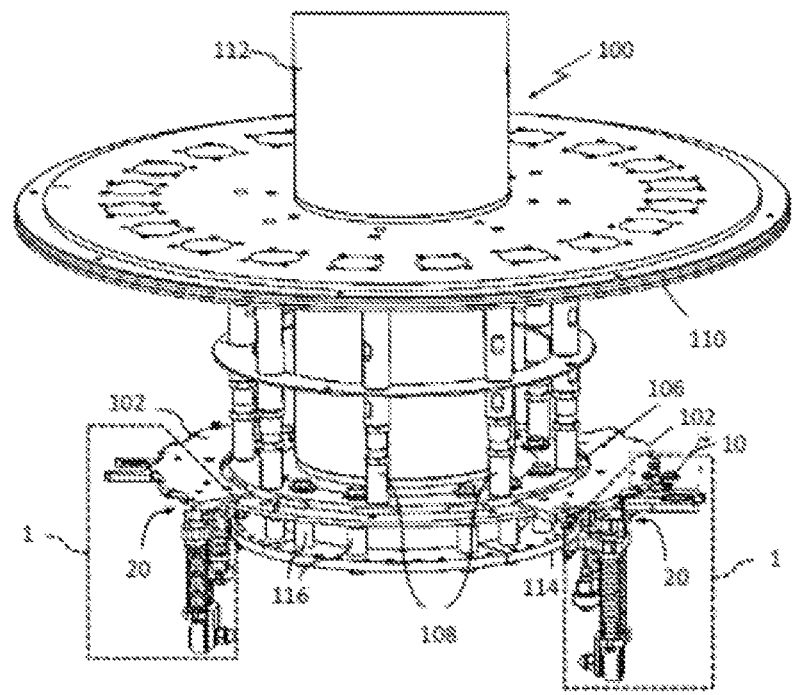
[Fig. 2]
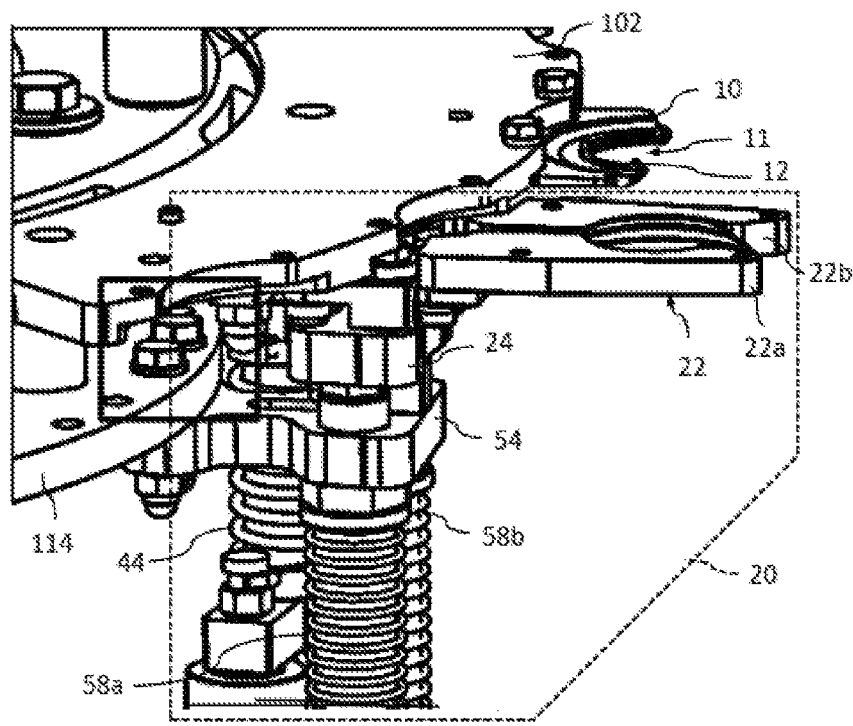

[Fig. 3]
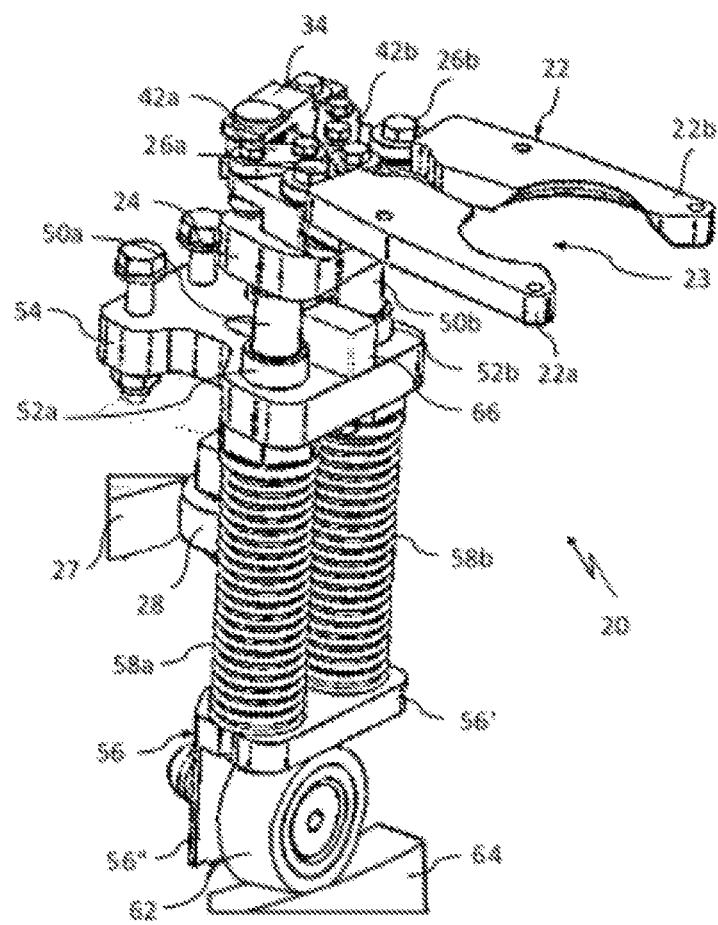

[Fig. 4]
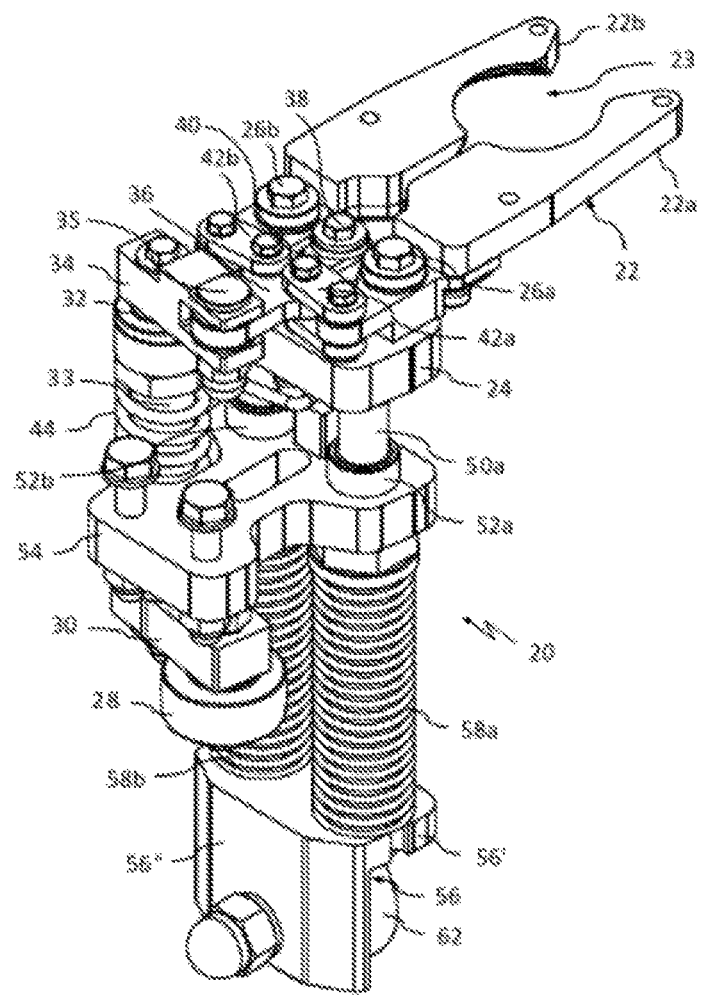
[Fig. 5]
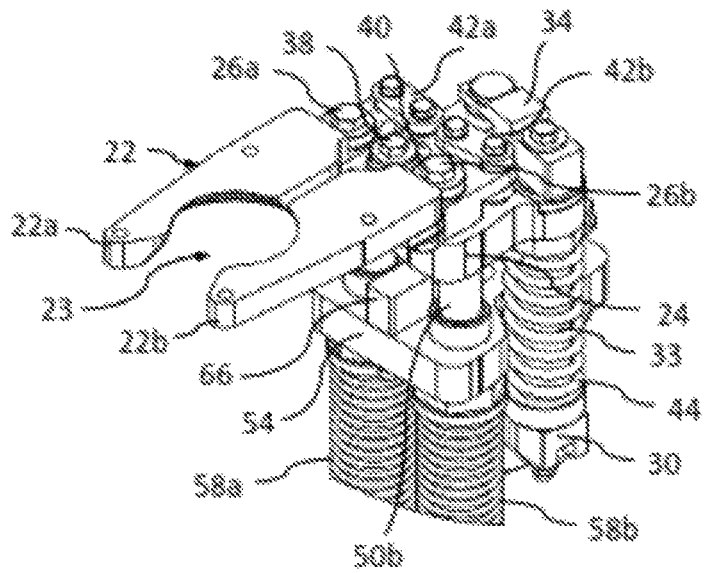

[Fig. 6]
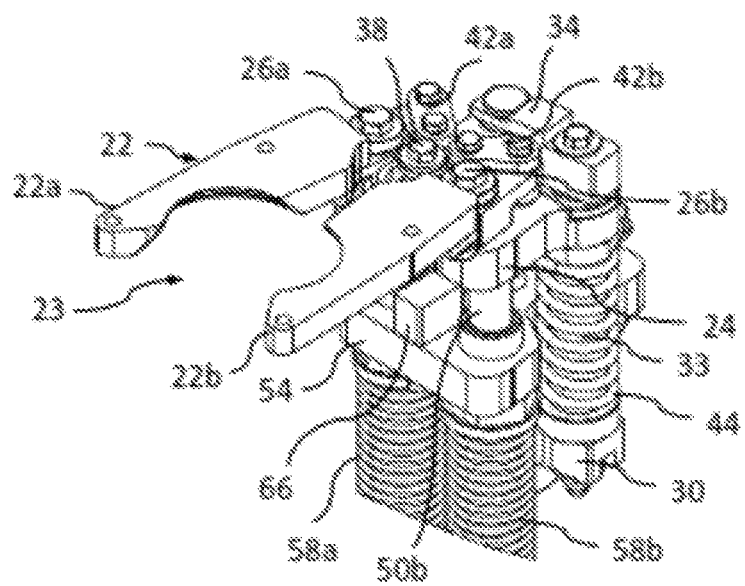
[Fig. 7]
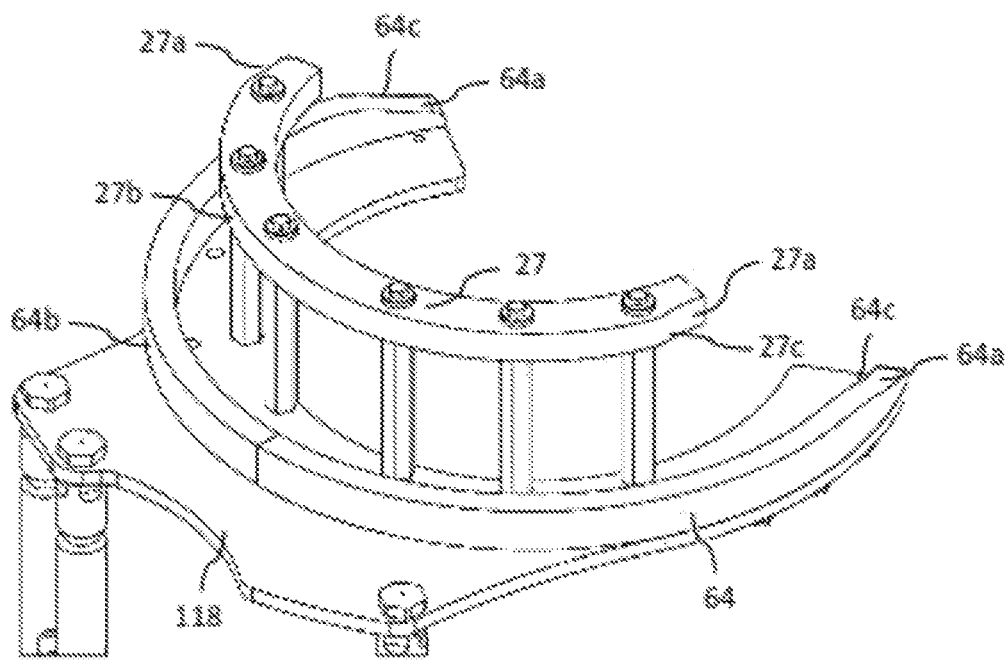

[Fig. 8]
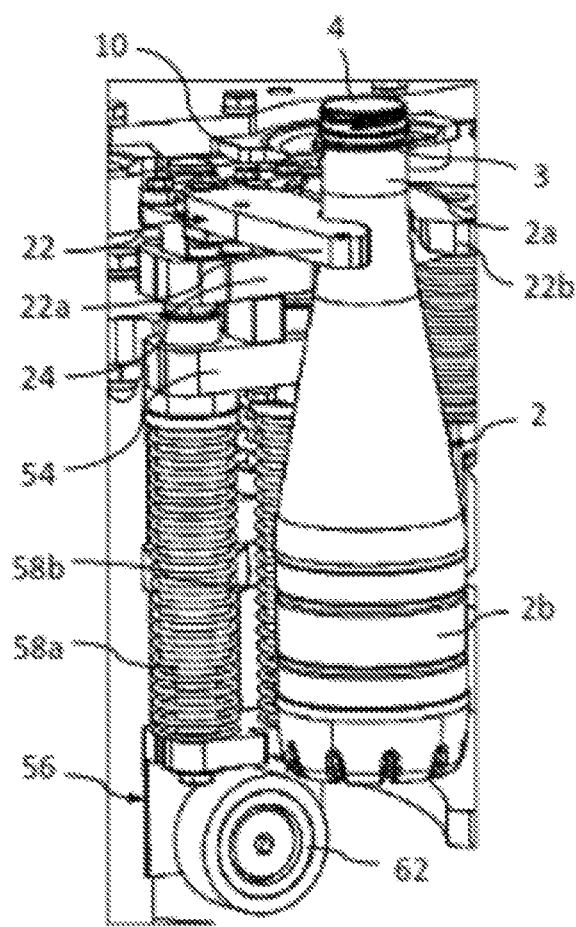

[Fig. 9]
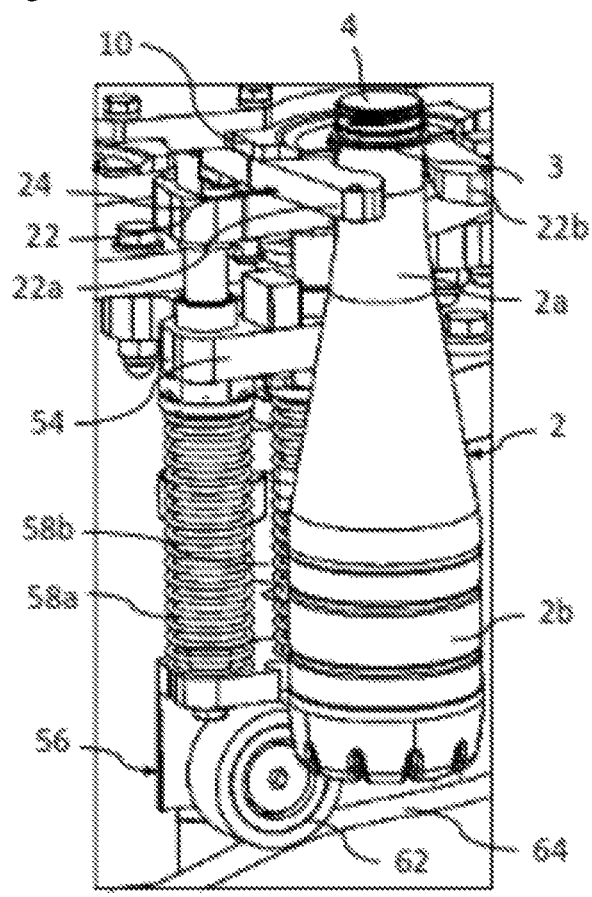

[Fig. 10]
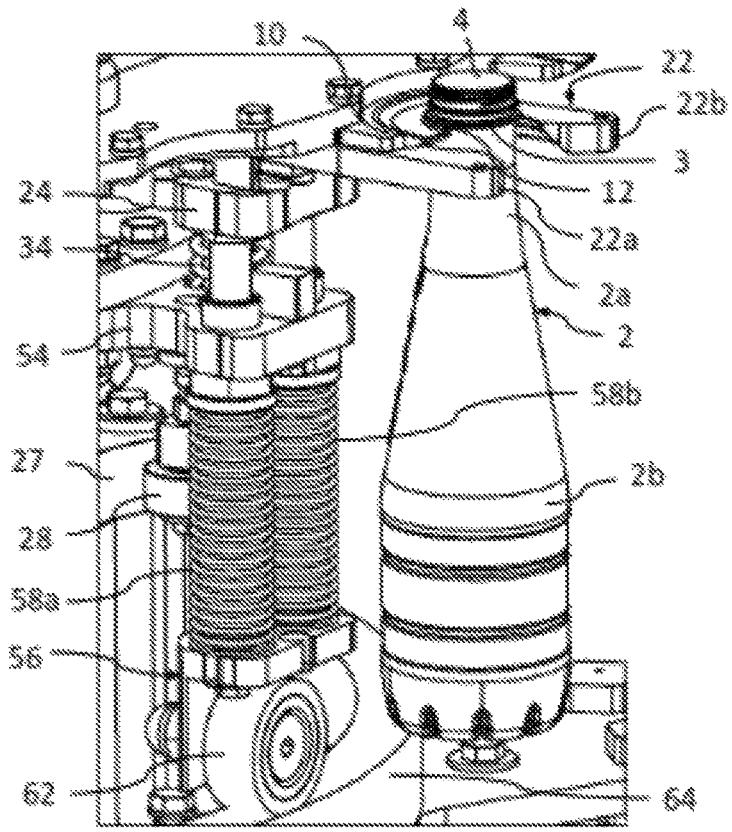
[Fig. 11]
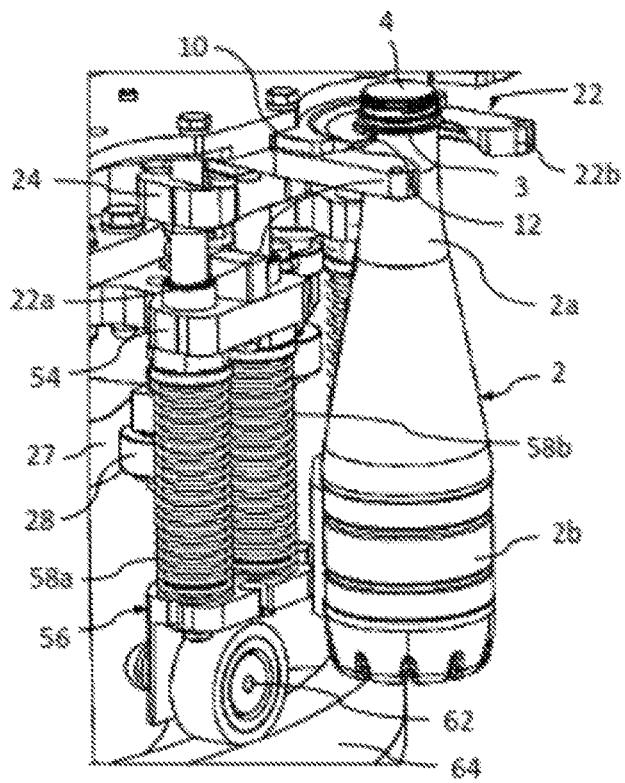

[Fig. 12]
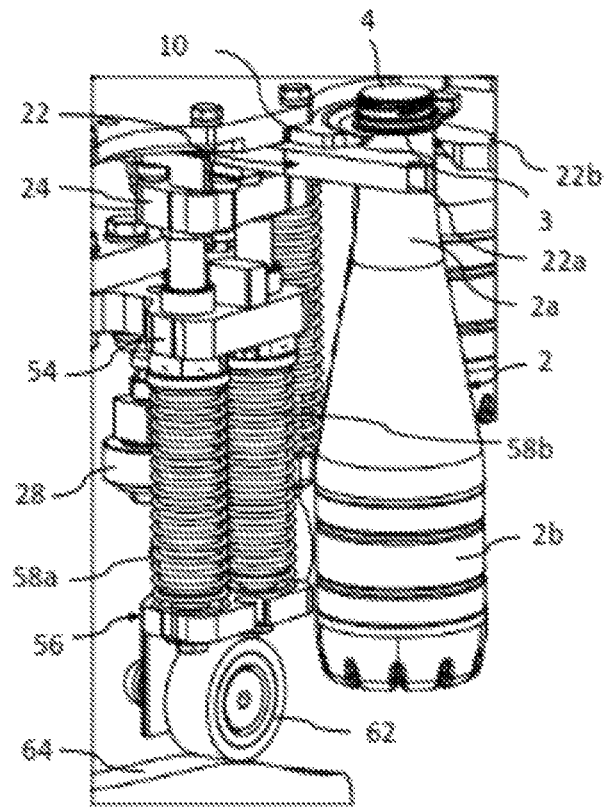
[Fig. 13]
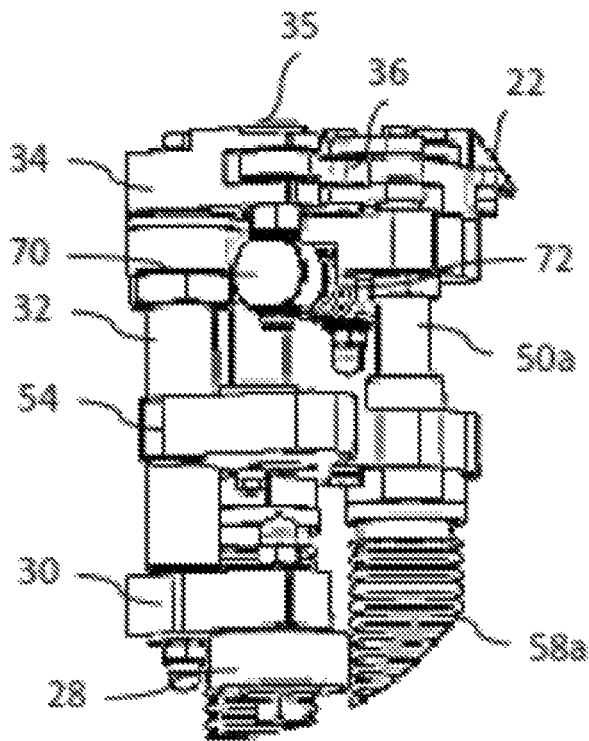

HANDLING DEVICE FOR CONTAINERS IN CAPPING INSTALLATIONS

TECHNICAL FIELD

The present invention relates to capping installations, and more specifically it relates to a handling device for holding and centering a container under a capping head in one such installation. The invention further relates to a capping method using such device.

Preferably, the invention finds application in capping installations in which screw caps are applied to containers having a neck provided with a rigid collar and in which gripping and centering take place by acting onto the neck region immediately below the collar, and the following description will address in particular this preferred application.

In the preferred application, the containers are bottles, and the term "bottles" will always be used in the following description for sake of clarity and simplicity.

In addition, taking into account that, in several capping installations, capping heads also have functions of measuring and/or inspection, for example measuring a cap screwing/unscrewing torque or the pressure of the gases present between a liquid contained in the container and the cap, checking physical or visual characteristics of the container, etc., hereinafter in the description and in the claims the capping head will generally be referred to as "working head".

Background Art

In order for the capping, measuring and/or inspection operations in the capping stations of a capping installation to take place in a proper manner, it is essential that bottles are placed in a perfectly vertical position and aligned with the axis of the head and cap and maintain this position during the operations for which said stations are intended. To this aim, the capping stations are equipped with devices for gripping and centering the bottles, which devices must guarantee proper positioning of the bottles relative to the working head and prevent rotation of the bottles caused by rotational movements of the working head during capping. Furthermore, during capping, a vertical force (compensation load or top load), which tends to increase the friction force on the neck region to prevent the bottle from rotating on itself or in any case from moving from its pre-set position. In this case, the gripping and centering devices must also prevent misalignments between the axes of bottle, cap and working head (and, in the case of plastic bottles, deformations) which prevent proper functioning of the working head.

In the case of bottles having a rigid collar, known gripping and centering devices comprise a support element having a side opening in which the neck of the bottle is received and on which the rigid collar rests, and a clamp member for holding the bottle in the recess. Examples of such devices are described in DE 1607970 A1, EP 1 712 496 A1, EP 2 383 221 A1 and U.S. Pat. No. 6,302,172 B1: these known devices, however, do not address the problems due to the top load.

EP 2 439 168 A1 e US 2011/089003 A1 also disclose devices in which the clamp member also performs the supporting function and is vertically slidable between two different working positions against the action of elastic elements. In EP 2 439 168 A1, sliding brings the clamp into contact with a fixed plate onto which the axial forces exerted by the capping head during cap application are discharged, without stressing the hinge pins of the clamp jaws. In US 2011/089003 A1, sliding controls the opening/closing of the clamp. These devices, too, do not address the problems due to the top load.

In addition, the known solutions are not applicable to multi-format installations without having to replace, at least partially, the gripping and centering devices whenever the format of the bottles to be acted upon varies.

WO 2018/203242 A1 describes a gripping and centering device having a centering ring resting on a shoulder between the neck and the body of the container, and a plurality of jaws that are distributed along the circumference of the centering ring and brought, by means of radial movement, to a working condition in which they engage the bottle neck.

U.S. Pat. No. 2,987,313 A describes a capping unit equipped with a handling device intended for handling containers and comprising a clamp gripping assembly and means for applying an axial load to a container during the capping step in order to prevent rotation or movement of the container.

SUMMARY OF INVENTION

The object of the invention is to provide a device and a method for handling, in particular holding and centering, a bottle under a working head in a capping installation, which device and method overcome the drawbacks of the prior art.

According to the invention, a handling device is provided having a centering member with a side recess arranged to receive a neck region of a container, and a clamp gripping assembly for holding the container during the operations performed in the capping station. The clamp gripping assembly is mounted so as to be vertically slidable between a first position, in which it is disengaged from the container and enables removing a capped container and receiving a container to be capped, and a second position, which is taken by the clamp gripping assembly during capping and/or inspection and in which it engages the container, and the clamp gripping assembly is associated with means controlling vertical sliding thereof and including first elastic means configured so as to keep the clamp gripping assembly in the second position when no stress is applied, and to apply, in said position, an axial load to the container.

Advantageously, the first elastic means include at least one compression spring arranged between a stationary support of the clamp gripping assembly and a member vertically sliding jointly with the clamp, which member is actuated for upward movement by a first cam mechanism, against the action of the at least one compression spring, in order to move the clamp to the first position.

According to another feature of the invention, the clamp gripping assembly further includes means controlling opening and closing of the clamp and including second elastic means configured so as to keep the clamp in closed condition when no stress is applied.

Advantageously, the second elastic means include a torsion spring associated with a vertical rod rotatable about its axis, which rod is connected with jaws of the clamp through a lever system and is rotated about its axis by a second cam mechanism, against the action of the torsion spring, to make the clamp open.

According to another aspect of the invention, a method is provided for capping containers in a capping unit equipped with a plurality of handling devices according to the invention. The method includes, for each container, the following steps:

arranging a clamp gripping assembly of a handling device in a first position, or raised position, by applying a compression stress to first elastic means, and arranging a clamp of the assembly in an open condition by applying a torsion or compression stress to second elastic means;

introducing a container to be capped into the handling device, so that a neck region of the container is received in a side recess of a centering member of the handling device and between the spread apart jaws of the open clamp;

removing the torsion or compression stress from the second elastic means in order to let the clamp close, while keeping the compression stress on the first elastic means in order to keep the clamp gripping assembly in the raised position;

removing the compression stress from the first elastic means in order to let the clamp gripping assembly, with the clamp closed, move to a second position, or lowered position, in which the clamp rests on the container;

applying the cap to the container;

at the end of the capping step, moving the clamp gripping assembly back to the raised position by applying again the compression stress to the first elastic means and, during the final part or at the end of the raising movement, make the clamp open again by applying again the torsion or compression stress to the second elastic means;

removing the capped container from the handling device.

BRIEF DESCRIPTION OF DRAWINGS

These and other features and advantages of the present invention will become apparent from the following description of preferred embodiments given by way of non-limiting example with reference to the accompanying drawings, in which:

FIG. 1 is a perspective view of a capping unit arranged in a capping installation and equipped with gripping and centering devices according to the invention;

FIG. 2 is an enlarged partial view of the gripping and centering device according to the invention and of the mounting thereof onto the capping unit;

FIG. 3 is an isometric view of the gripping assembly, in the open position;

FIG. 4 is an isometric view, taken from a different angle with respect to FIG. 3, of the gripping assembly, in the closed position;

FIG. 5 is an isometric view of the clamp of the gripping assembly, in the closed position;

FIG. 6 is an isometric view of the clamp of the gripping assembly, in the open position;

FIG. 7 is a schematic perspective view of the cams used for controlling raising and the opening/closing of the clamp of the gripping assembly;

FIG. 8 shows an operation step of the device during the capping operations;

FIG. 9 shows a further operation step of the device during the capping operations;

FIG. 10 shows a further operation step of the device during the capping operations;

FIG. 11 shows a further operation step of the device during the capping operations;

FIG. 12 shows a further operation step of the device during the capping operations;

FIG. 13 is an enlarged partial view of the gripping and centering device according to an embodiment variant of the invention.

DESCRIPTION OF EMBODIMENTS

Referring to FIGS. 1 and 2, there is schematically shown a rotary capping unit 100 belonging to a capping and/or inspection station of a capping installation, equipped with a plurality of devices 1 according to the invention, for handling, in particular for gripping and centering, bottles 2 (shown only in FIGS. 8-12), specifically bottles to which a screw cap 4 is to be applied and which are provided, in the neck region 2a, with a rigid collar or finish 3. The capping unit 100 is arranged to continuously rotate between different working positions, according to a cycle in which a bottle 2 is received in the capping unit 100, is capped by appropriate cap-applying members and finally exits the capping unit.

The devices 1 consist each of two distinct parts: a centering member 10 and a clamp gripping assembly, indicated as a whole with 20.

The centering member 10 consists of a plate element having a side recess or opening 11 intended to receive the neck region 2a of a bottle so that the collar 3 rests on the upper face of the centering member 10 in such a way as to be supported thereby during capping. The centering member 10 is further provided, along the rim of the recess 11, with teeth 12 (only one of which is visible in the figure) intended to engage the lower portion of the collar 3 so as to hold the bottle 2 and prevent it from rotating under the action of the screwing torque applied to the cap 4. Elements of this type are commonly used in capping units. The centering member 10 is stationarily mounted, for example screwed, to a centering member-holding plate 102 attached in turn to a centering member-holding flange 106 of the capping unit 100. The flange 106 is connected, by means of tie-rods 108, to a further flange 110, in particular the flange bearing the capping axes. The flanges 106 and 110 are rotationally integral with a shaft 112 transmitting the above-mentioned rotation movement to the capping unit 100. It should be noted that the centering member-holding plates 102 could also be omitted and the centering members 10 could be mounted directly to the centering member-holding flange 106.

Each clamp gripping assembly 20 is carried by a support 54, which in turn is attached to a support flange 114, this flange, too, being rotationally integral with the shaft 112. The flange 114 may be divided into several sectors corresponding to centering member-holding sectors 105 and is connected to the centering member-holding flange 106 by means of columns 116. The clamp gripping assembly 20 is mounted in such a way that the clamp 22 of the gripping assembly 20 is located under the centering member 10.

The gripping assembly 20 comprises, besides the clamp 22, mechanisms controlling opening and closing of the clamp 22 and vertical sliding thereof with respect to the support 54 between a raised position, taken by the clamp during change from a capped bottle 2 and a bottle to be capped, and a lowered position, taken by the claim during screwing of the cap 4, and vice versa. As will be better described below, opening of the clamp 22 and raising thereof take place against the action of elastic members tending to keep the clamp in its closed, lowered position. In the raised position, the clamp 22 is at the neck region 2a of a bottle 2 which is received in the recess 23 between the arms or jaws 22a, 22b of the clamp 22, whereas in the lowered position the clamp 22 rests on the shoulder formed by the connection region between the neck 2a and the body 2b of the bottle 2 and applies a vertical (or axial) load to the bottle. The jaws 22a, 22b are configured so as not to be in contact with the neck 2a in the closed, raised position of the clamp 22. The shape of the jaws 22a, 22b is not customized to a given bottle 2, but it is devised so as to be able to conform to the widest range of bottle shapes. Sliding also makes it possible to employ the device 1 with bottles of different shape, in which the point of contact with the clamp assembly 20 can be located at different heights, without having to replace any parts. Acting onto the upper part of the bottle 2 also exploits the fact that differences related to format, especially with bottles obtained by means of a same parison, are less pronounced when getting closer to said part.

Referring to FIGS. 3-6, the mechanisms controlling vertical sliding and opening and closing of the clamp 22 will now be described.

The arm or jaws 22a, 22b of the clamp 22 are hinged, for example by means of corresponding screws 26a, 26b, to a support 24 vertically sliding jointly with the clamp. Rotation of the arms 22a, 22b for opening/closing the clamp 22 is obtained by means of a kinematics having irreversibility features that do not allow opening the clamp by acting onto the arms thereof. More specifically, opening is controlled by a first counteracting roller (cam follower) 28, which, during rotation of the capping unit 100, moves on the lateral surface of an eccentric cam 27. The configuration of cam 27 will be described below, with reference to FIG. 7. The roller 28 is linked to an end of a rocking arm 30, the other end of which is integral with the lower end of a vertical rod 32 arranged to rotate about its axis inside a guide sleeve 33. The guide sleeve 33 is integral with the sliding support 24 and the rod 32 is translationally integral therewith. A torsion spring 44, whose ends are attached to the rocking arm 30 and to the sliding support 24, respectively, is coiled on the outer surface of the sleeve 33. The arrangement is such that a thrust exerted onto the roller 28 by virtue of its movement on the cam 27 causes rotation of the rod 32 against the action of the spring 44, which is set so as to keep the arms 22a, 22b in the closed position when no thrust is exerted onto the roller 28. At its upper end, the rod 32 is integral with an end of a second rocking arm 34 which is carried by the sliding support 24 and, at the opposite end, is connected to a thrust member 36 which can slide from a retracted position (taken by said member when the clamp is closed) to an advanced position (taken by said member when the clamp is open). Sliding of the thrust member 36 is guided for example by a pin 38 or the like which engages into a slot 40 of the thrust member 36. An end of a pair of further levers or rocking arms 42a, 42b is hinged to the thrust member 36, and the other end of said pair is hinged to the rear portion of the arms 22a, 22b, in a retracted position with respect to the hinge screws 26a, 26b. It is evident that with this arrangement, the forward sliding movement of the thrust member 36 causes, through the levers 42a, 42b, rotation of the arms 22a, 22b about the respective hinge pins in the direction of opening of the clamp 22.

As far as vertical sliding of the clamp 22 and its support 24 is concerned, said support is mounted to the upper end of at least one rod, preferably a pair of rods 50a, 50b, vertically sliding in sleeves 52a, 52b carried by the stationary support 54 of the clamp gripping assembly 20. At their lower end, the rods 50a, 50b are attached to a further support member 56, this further support member, too, being vertically movable. This further support member has, for example, a substantially L-shaped vertical section, with a horizontal segment 56' (preferably forming an upper part thereof) to which the rods 50a, 50b are attached. Springs 58a, 58b, coiled about the sleeves 52a, 52b, determining the axial load applied to the bottle 2, are arranged between the facing surfaces of the stationary support 54 and of the horizontal segment 56' of the movable support 56. The load exerted by the springs 58 could also be adjustable, through means not shown but well known to the person skilled in the art. A second counteracting roller 62, which, during rotation of the capping unit 100, moves on the upper surface of a drum cam 64, described below with reference to FIG. 7, is mounted on the vertical segment 56" of the movable support. The arrangement is such that the thrust exerted against the roller 62 by virtue of its movement on the cam 64 raises the rods 50a and 50b against the action of the springs 58a e 58b. The rods 50a and 50b move back to the lowered position when no thrust is exerted thereonto.

It can further be seen from the figures that, on the upper face of the support 54 there is provided a stop member 66 limiting the downward stroke of the clamp 22 during the times in which there is no bottle to be capped and the roller 62 are not in contact with the cam 64.

Referring to FIG. 7, the cams 27, 64 are arch-shaped elements of different length, corresponding to a first and second angular sector of rotation of the capping unit 100, respectively, and mounted to a stationary part 118 of the capping installation. The cam 27 has a length smaller than that of the cam 64 and its relative position with respect thereto is such that the thrust on the roller 28 can be removed (FIGS. 3, 4) and the clamp 22 can thus be closed, whereas the roller 62 is still biased and keeps the clamp 22 raised, as required during some operation steps of the capping unit. Both cams have end portions 27a and 64a, respectively, with reduced thickness (in the radial direction for the cam 27 acting though its lateral surface, and in the axial direction for the cam 64 acting through its upper face), and a central portion 27b and 64b, respectively, having a greater and constant thickness and extending over most part of the length of the cam. Said central portion is joined to the end portions by means of raising/lowering ramps 27c and 64c, respectively.

Operation of the invention will now be described with reference to FIGS. 8-12. Said operation provides for at least five situations of interaction between the clamp 22 and the cams 27, 64.

A first situation corresponds to the actual capping step. In this situation, the rollers 28 and 62 are not in contact with the cams 27 and 64. Accordingly, the springs 44, 58a, 58b are in a rest condition and keep the clamp 22 closed and in its lowered position in which it rests on the shoulder between the neck 2a and the body 2b of the bottle 2. Therefore, the vertical load set by the springs 58a, 58b is applied to said bottle and the collar 3 is in engagement with the teeth 12 of the centering member 10. This situation is shown in FIG. 8.

Once application of the cap 4 is completed, rotation of the capping unit 100 brings the roller 62 to the cam 64 and causes said roller to move upwards towards the central portion 64b thereof along the raising ramp 64c. The roller 62 thus causes raising of the clamp 22 through the support 56 and the rods 50a, 50b, and consequent compression of the springs 58a, 58b. Thanks to the configuration of the cams, in this step the roller 28 is not yet in contact with the cam 27 and the clamp 22 remains closed, without, however, clamping the neck 2a. This situation is shown in FIG. 9.

Once raising of the cam 64 by means of the roller 62 is completed (or in the final part of such raising), the roller 28 comes into contact with the cam 27 and slides along the raising ramp 27c thereof, thus causing opening of the jaws 22a, 22b against the action of the torsion spring 44. Opening must be adjusted over time so as to allow the capped bottle 2 to be taken out by the appropriate transfer star. This situation is shown in FIG. 10.

Over a further arc of rotation of the capping unit 100, the rollers 28 and 62 continue to be in engagement with the upper portion of the respective cams 27 and 64, and therefore the clamp 22 remains raised and open. In this condition, the device 1 can receive a bottle 2 to be capped, whose neck 2a is placed in the opening 11 of the centering member 10 and between the spread apart arms 22a, 22b of the clamp 22 (FIG. 11).

Once the bottle 2 to be capped has entered the capping unit 100, the roller 28 is lowered to the recessed portion 27a of the cam 27 over the lowering ramp 27c, thus removing the biasing force exerted on the spring 44, thereby causing closing of the clamp 22 (still without clamping the neck 2a). The roller 62, instead, is still in the upper part 64b of the cam 64 and thus keeps the clamp 22 in the raised position (FIG. 12).

Once closing of the clamp 22 is completed (or in the final part of such closing), the roller 62 reaches the lowering ramp 64c and comes to the recessed end portion 64a of the cam 64, whereby the springs 58a, 58b cause the clamp 22 to be lowered until it rests against the bottle 2. During the lowering step of the roller 62, the roller 28 is no longer in contact with the cam 27. The roller 62 then leaves the cam 64 and the system returns to the condition shown in FIG. 8 to cap the new bottle.

With the capping unit equipped with a handling device operating in the described manner, the method of capping a bottle 2 takes place as follows:
 the clamp gripping assembly 20 is arranged in a first position (raised position) by applying a compression stress to the compression springs 58a, 58b and the clamp 22 is kept open by applying a torsion stress to the spring 44;
 a container 2 to be capped is introduced into the handling device 1, so that the neck region 2a of the container 2 is received in the side recess 11 of the centering member 10 of the handling device 1 and between the spread apart jaws 22a, 22b of the open clamp 22;
 the torsion stress is removed from the spring 44 in order to let the clamp 22 close, while the clamp gripping assembly 20 is kept in the raised position;
 the compression stress is removed from the springs 58a, 58b in order to let the clamp gripping assembly 20, with the clamp 22 closed, move to a second position (lowered position), in which the clamp 22 rests on the shoulder between the neck 2a and the body 2b;
 the cap is applied to the container 2;
 at the end of the capping operation, the clamp gripping assembly 20 is moved again to the raised position by applying again the compression stress 58a, 58b and, during the final part of the raising or at the end thereof, the clamp 22 is opened again by applying again the torsion stress to the spring 44;
 the capped container 2 is removed from the handling device 1.

The described steps are then repeated for a new bottle 2.

In the variant shown in FIG. 13, opening of the clamp 22 is counteracted by a compression spring rather than by a torsion spring. To this aim, the pin 35 connecting the thrust member 36 to the rocking arm 34 vertically passes through the head of a slider 70 which slides, by virtue of rotation of the arm 34, in a horizontal seat formed in a sleeve on which a helical spring 72 is coiled, which is compressed by the head of the slider 70 during sliding thereof. Sliding of the slider 70 is simultaneous with and concordant with that of the thrust member 36. In this arrangement, the spring 72 is thus compressed when the roller 28 slides along the raising ramp 27c and the central portion 27b of the cam 27, and causes re-opening of the clamp 22 when the cam 27 is lowered to the recessed portion 27a of the cam 27 along the lowering ramp 27c. The operation is exactly the same as the one described in connection with the torsion spring 44.

It is evident that the above description has been given solely by way of non-limiting example, and that the construction details and the embodiments may be widely varied with respect to what has been described and illustrated, without however departing from the scope of the present invention as defined by the following claims which form an integral part of the technical teaching of the invention provided herein.

In particular, although the invention has been described with reference to bottles fitted with a rigid collar in the neck region, it can also be applied to bottles without such a collar. In this case, in a known manner, the centering member 10 could engage the lower portion of the hanging strip of the security seal ensuring integrity of the cap. Furthermore, the invention can also be applied to different containers, provided that such containers have a shoulder on which the clamp 22 can rest.

The invention claimed is:

1. A handling device (1) for handling containers (2) in a capping and/or inspection station of a capping installation, the device (1) comprising:
 a centering member (10) having a side opening (11) arranged to receive a neck region (2a) of a container (2), and a clamp gripping assembly (20) for holding the container (2) during the operations performed in said station,
 wherein the clamp gripping assembly (20) is mounted so as to be vertically slidable between a first position, in which the clamp gripping assembly (20) is disengaged from the container (2) and enables removing a capped container (2) and receiving a container (2) to be capped, and a second position, which is taken by the clamp gripping assembly during capping and/or inspection and in which the clamp gripping assembly (20) engages the container (2),
 wherein the clamp gripping assembly is associated with means controlling vertical sliding thereof, including first elastic means (58a, 58b) configured so as to keep the clamp gripping assembly (20) in the second position when no stress is applied, and to apply, in said second position, an axial load to the container (2),
 wherein the clamp gripping assembly (20) has a clamp (22) and further includes means controlling opening and closing of the clamp (22),
 wherein said means controlling opening and closing of the clamp (22) includes second elastic means (44; 72) configured so as to keep the clamp (22) in closed condition when no stress is applied, and
 wherein the second elastic means includes a torsion spring (44) associated with a vertical rod (32) rotatable about an axis of the vertical rod (32), which rod is connected with jaws (22a, 22b) of the clamp (22) through a lever system (34, 36, 42a, 42b) and is rotated about the axis by a second cam mechanism (27, 28), against the action of the torsion spring (44), to make the clamp (22) open.

2. The handling device (1) according to claim 1, wherein the first elastic means (58a, 58b) are arranged to keep the clamp (22) of the clamp gripping assembly (20), in said second position, in contact with a shoulder connecting the neck region (2a) and a body region (2b) of the container (2).

3. The handling device (1) according to claim 1, wherein the first elastic means (58a, 58b) include at least one compression spring (58a, 58b) arranged between a stationary support (54) of the clamp gripping assembly (20) and a member (56) vertically slidable jointly with the clamp (22) of the clamp gripping assembly (20), which member is actuated for upward movement by a first cam mechanism (62, 64), against the action of the at least one compression spring (58a, 58b), in order to move the clamp (22) to the first position.

4. The handling device (1) according to claim 3, wherein said stationary support (54) of the clamp gripping assembly (20) is associated with a stop member (66) arranged to limit a downward stroke of the clamp (22) when no container (2) is present.

5. The handling device (1) according to claim 1, wherein the first elastic means (58a, 58b) is associated with means for adjusting said axial load.

6. The handling device (1) according to claim 1, wherein said lever system (34, 36, 42a, 42b) is configured so as to prevent the clamp (22) from opening under the action of a force applied to the clamp jaws (22a, 22b).

7. A method of capping containers (2) in a capping unit (100) equipped with the handling device (1) according to claim 1, the handling device being intended to hold and center a container (2) under a working head, the method being characterized in that it includes, for each container (2), the following steps:
  arranging the clamp gripping assembly (20) of the handling device (1) in the first position, or raised position, by applying a compression stress to the first elastic means (58a, 58b), and arranging the clamp (22) of the assembly (20) in an open condition;
  introducing a container (2) to be capped into the handling device (1), so that a neck region (2a) of the container (2) is received in the side opening (11) of the centering member (10) of the handling device (1) and between spread apart jaws (22a, 22b) of the open clamp (22);
  closing the clamp (22) while continuing applying the compression stress to the first elastic means (58a, 58b) in order to keep the clamp gripping assembly (20) in the raised position;
  removing the compression stress from the first elastic means (58a, 58b) in order to let the clamp gripping assembly (20), with the clamp (22) closed, move to the second position or lowered position, in which the clamp (22) rests on the container (2);
  applying a cap (4) to the container (2);
  at the end of the capping step, moving the clamp gripping assembly (20) back to the raised position by applying again the compression stress to the first elastic means (58a, 58b) and, during a final part or at an end of the raising movement, make the clamp (22) open again;
  removing the capped container (2) from the handling device (1).

8. The method according to claim 7, wherein the step of arranging the clamp (22) of the clamp gripping assembly (20) in an open condition includes applying a torsion or compression stress to opening and closing members (44; 72) of the clamp (22).

9. The method according to claim 8, wherein the step of closing the clamp (22) takes place by removing the torsion or compression stress applied to the opening and closing members (44; 72) of the clamp (22).

10. The method according to claim 7, wherein the step of closing the clamp (22) takes place by removing the torsion or compression stress applied to opening and closing members (44; 72) of the clamp (22).

11. A handling device (1) for handling containers (2) in a capping and/or inspection station of a capping installation, the device (1) comprising:
  a centering member (10) having a side opening (11) arranged to receive a neck region (2a) of a container (2); and
  a clamp gripping assembly (20) for holding the container (2) during the operations performed in said station,
  wherein the clamp gripping assembly (20) is mounted so as to be vertically slidable between a first position, in which the clamp gripping assembly (20) is disengaged from the container (2) and enables removing a capped container (2) and receiving a container (2) to be capped, and a second position, which is taken by the clamp gripping assembly during capping and/or inspection and in which the clamp gripping assembly (20) engages the container (2);
  wherein the clamp gripping assembly is associated with means controlling vertical sliding thereof, including first elastic means (58a, 58b) configured so as to keep the clamp gripping assembly (20) in the second position when no stress is applied, and to apply, in said second position, an axial load to the container (2);
  wherein the clamp gripping assembly (20) has a clamp (22) and means controlling opening and closing of the clamp (22);
  wherein said means controlling opening and closing of the clamp (22) includes second elastic means (44; 72) configured so as to keep the clamp (22) in closed condition when no stress is applied; and
  wherein the second elastic means includes a helical spring (72) associated with a sliding member (70) that is made to horizontally slide against the action of the helical spring (72) because of the rotation of a vertical rod (32), which is connected with jaws (22a, 22b) of the clamp (22) through a lever system (34, 36, 42a, 42b) and is rotated by a second cam mechanism (27, 28) to make the clamp (22) open.

12. The handling device (1) according to claim 11, wherein the first elastic means (58a, 58b) is arranged to keep the clamp (22) of the clamp gripping assembly (20), in said second position, in contact with a shoulder connecting the neck region (2a) and a body region (2b) of the container (2).

13. The handling device (1) according to claim 11, wherein the first elastic means (58a, 58b) includes at least one compression spring (58a, 58b) arranged between a stationary support (54) of the clamp gripping assembly (20) and a member (56) vertically slidable jointly with the clamp (22) of the clamp gripping assembly (20), which member is actuated for upward movement by a first cam mechanism (62, 64), against the action of the at least one compression spring (58a, 58b), in order to move the clamp (22) to the first position.

14. The handling device (1) according to claim 13, wherein said stationary support (54) of the clamp gripping assembly (20) is associated with a stop member (66) arranged to limit a downward stroke of the clamp (22) when no container (2) is present.

15. The handling device (1) according to claim 11, wherein the first elastic means (58a, 58b) is associated with means for adjusting said axial load.

16. The handling device (1) according to claim 11, wherein said lever system (34, 36, 42a, 42b) is configured so as to prevent the clamp (22) from opening under the action of a force applied to the clamp jaws (22*a*, 22*b*).

17. A method of capping containers (2) in a capping unit (100) equipped with the handling device (1) according to claim 11, the handling device being intended to hold and center a container (2) under a working head, the method being characterized in that it includes, for each container (2), the following steps:

arranging the clamp gripping assembly (20) of the handling device (1) in the first position, or raised position, by applying a compression stress to the first elastic means (58*a*, 58*b*), and arranging the clamp (22) of the assembly (20) in an open condition;

introducing a container (2) to be capped into the handling device (1), so that a neck region (2*a*) of the container (2) is received in the side opening (11) of the centering member (10) of the handling device (1) and between spread apart jaws (22*a*, 22*b*) of the open clamp (22);

closing the clamp (22) while continuing applying the compression stress to the first elastic means (58*a*, 58*b*) in order to keep the clamp gripping assembly (20) in the raised position;

removing the compression stress from the first elastic means (58*a*, 58*b*) in order to let the clamp gripping assembly (20), with the clamp (22) closed, move to the second position or lowered position, in which the clamp (22) rests on the container (2);

applying a cap (4) to the container (2);

at the end of the capping step, moving the clamp gripping assembly (20) back to the raised position by applying again the compression stress to the first elastic means (58*a*, 58*b*) and, during a final part or at an end of the raising movement, make the clamp (22) open again;

removing the capped container (2) from the handling device (1).

18. The method according to claim 17, wherein the step of arranging the clamp (22) of the clamp gripping assembly (20) in an open condition includes applying a torsion or compression stress to opening and closing members (44; 72) of the clamp (22).

19. The method according to claim 18, wherein the step of closing the clamp (22) takes place by removing the torsion or compression stress applied to the opening and closing members (44; 72) of the clamp (22).

20. The method according to claim 17, wherein the step of closing the clamp (22) takes place by removing the torsion or compression stress applied to opening and closing members (44; 72) of the clamp (22).

* * * * *